United States Patent [19]
Carlson, Jr. et al.

[11] Patent Number: 6,019,321
[45] Date of Patent: *Feb. 1, 2000

[54] MODULAR FURNITURE INTERCONNECTION PANEL

[75] Inventors: Robert C. Carlson, Jr., Torrington; C. K. Tripp Siemon, Woodbury, both of Conn.; Mark Bassil, N. Bergen, N.J.

[73] Assignee: The Siemon Company, Watertown, Conn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/777,124

[22] Filed: Dec. 30, 1996

[51] Int. Cl.$^7$ ........................................................ F16L 3/00
[52] U.S. Cl. ................................ 248/49; 248/56; 248/65; 248/439; 312/223.6
[58] Field of Search ................................ 248/49, 56, 65, 248/439; 312/223.1, 223.6

[56] References Cited

U.S. PATENT DOCUMENTS

| | | | |
|---|---|---|---|
| 2,531,110 | 11/1950 | Cisler | 312/223.6 |
| 3,253,083 | 5/1966 | Timbers | 248/49 |
| 4,437,711 | 3/1984 | Dahnert | 312/223.6 |
| 4,602,829 | 7/1986 | DeAndrea | 312/223.1 |
| 4,643,379 | 2/1987 | Potocnik | 248/49 |
| 4,768,652 | 9/1988 | Fallon | 312/223.1 |
| 5,240,209 | 8/1993 | Kutsch | 248/49 |
| 5,303,320 | 4/1994 | Duffie . | |
| 5,422,436 | 6/1995 | Bachrai | 248/56 |
| 5,451,714 | 9/1995 | Duffié . | |
| 5,568,362 | 10/1996 | Hansson | 312/223.6 |
| 5,573,321 | 11/1996 | Bell, Jr. | 312/223.1 |

FOREIGN PATENT DOCUMENTS

| | | | |
|---|---|---|---|
| 0300197 | 5/1992 | Germany | 248/49 |
| 2224294 | 5/1990 | United Kingdom | 248/49 |

OTHER PUBLICATIONS

Design Resource Group International, Inc. brochure —Date Unknown.

Holocomm Systems, Inc. Brochure "Information on the Holocomm System", Date unknown.

Primary Examiner—Victor N. Sakran
Attorney, Agent, or Firm—Cantor Colburn LLP

[57] ABSTRACT

A modular furniture panel including a bracket including a plurality of telecommunications connectors. The bracket is positioned within the modular furniture panel and provides an interconnection point for routing telecommunication cable from a telecommunications closet to the work area. The bracket may be fitted with a variety of telecommunication connectors to accommodate different cable types (copper, optical fiber, co-axial, etc.). Panel covers conceal the bracket and cable located in the interior of the panel. Areas on either side of the bracket are used for cable management including storage, routing and/or splicing of cables.

23 Claims, 5 Drawing Sheets

MODULAR FURNITURE INTERCONNECTION PANEL

BACKGROUND OF THE INVENTION

1. Field of the Invention

The invention relates in general to modular furniture and in particular to a modular furniture panel including a bracket that provides an interconnection point for a variety of telecommunication connectors.

2. Prior Art

Typically, in an office environment, telecommunications cables are routed from a telecommunication closet to the work area where they are hard wired (terminated) to work area outlets. In many instances, cables extending from the telecommunications closet are routed into modular furniture and through furniture pathways to individual work area outlets where they are terminated to a telecommunications outlet. If the movement of any furniture is required in the future, any cables routed through the furniture would have to be completely removed from the telecommunications outlet all the way back to the telecommunications closet. This renders movement of office furniture more difficult and time consuming.

SUMMARY OF THE INVENTION

The above-discussed and other drawbacks and deficiencies of the prior art are overcome or alleviated by the modular furniture panel including a telecommunications interconnection bracket of the present invention. The bracket provides an array of telecommunication connector openings that allow modular connectors to be mounted to the bracket thereby providing an interconnection point for telecommunications cable. The connecting hardware used as part of the interconnection point will have the ability to support a variety of cable types. The bracket and associated connectors are mounted within the confines of the furniture panel so that all cables and connections are concealed and out of sight after furniture panel covers are installed.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES.

DETAILED DESCRIPTION OF THE INVENTION

Figure 1:
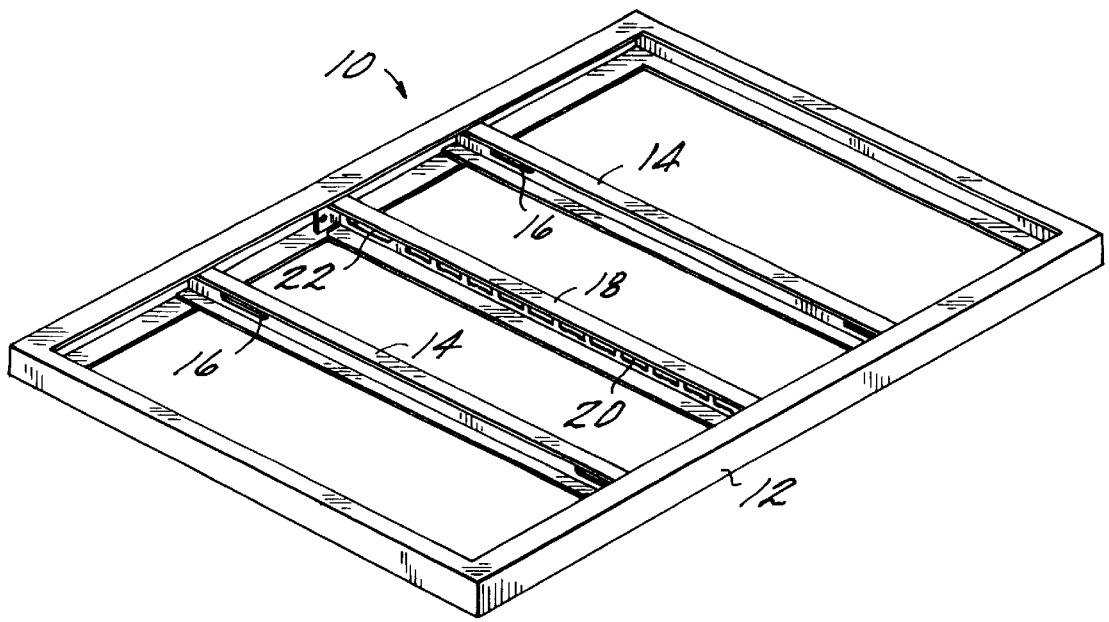
FIG. 1 is a perspective view of a modular furniture panel including a telecommunications interconnection bracket.

FIG. 1 is a perspective view of a modular furniture panel including a telecommunications interconnection bracket shown generally at 10. The panel is made up of a plurality of connected members 12. The members 12 may have a U-shape to strengthen the panel. The members 12 are preferably made from metal (e.g. steel) and are welded or bolted together and subsequently painted. The panel 10 may also include support members 14 for enhancing the structural integrity of the panel 10. The support members 14 may be U-shaped to provide additional strength. The support members 14 include openings 16 for routing telecommunications cable through the support members. It is understood that "cable" refers to copper, optical fiber, coaxial cable, etc. Telecommunications bracket 18 includes plurality of openings 20 for mounting telecommunications connectors. The bracket 18 may be U-shaped to provide additional strength. It is understood that "telecommunications" refers to voice, data and any other signal and is not limited to telephonic communications. The bracket 18 also includes an opening 22 for routing wire through the bracket. The bracket 18 may be incorporated in the panel when the panel is manufactured or be added to the furniture panel in the field as a retrofit. Although the bracket 18 is shown in a horizontal orientation, it is understood that the bracket 18 may be mounted in a vertical orientation or any angular position within the panel.

Figure 2:
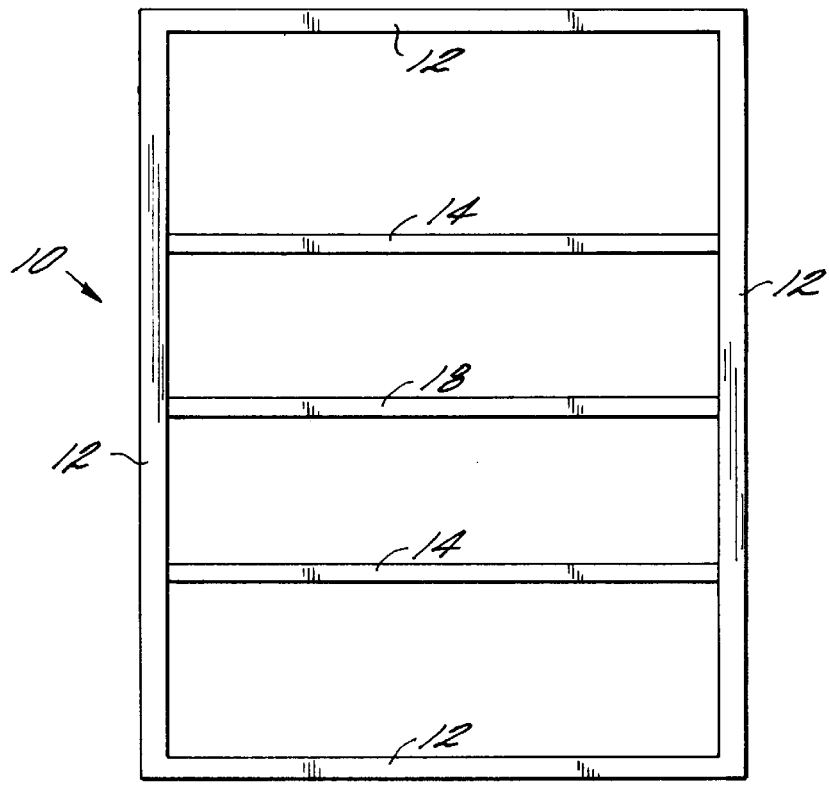
FIG. 2 is a front view of the modular furniture panel including a telecommunications interconnection bracket.
Figure 5:
FIG. 5 is a top view of the telecommunications interconnection bracket.
Figure 4:
FIG. 4 is a side view of the telecommunications interconnection bracket.
Figure 3:
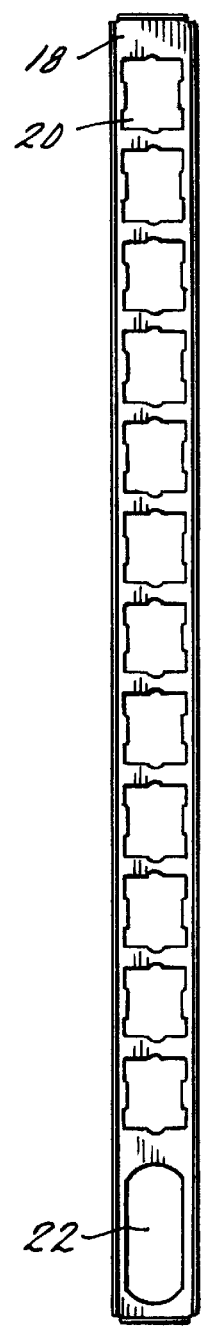
FIG. 3 is a front view of the telecommunications interconnection bracket.
Figure 6:
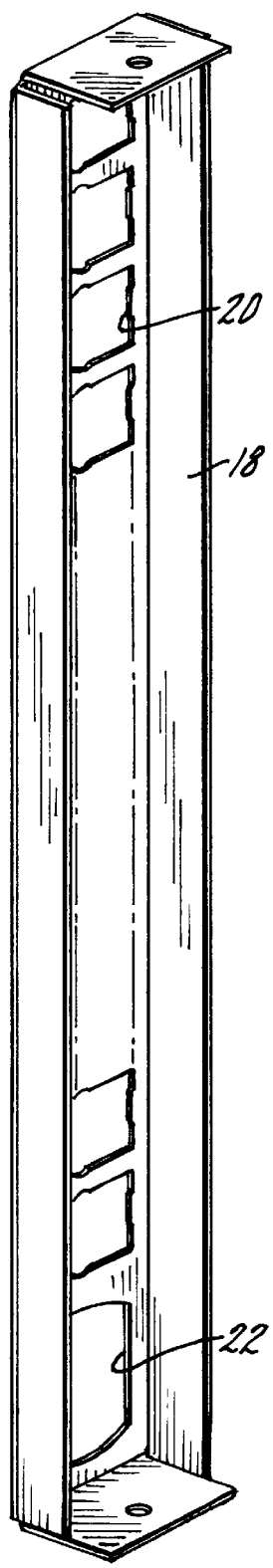
FIG. 6 is a perspective view of the telecommunications interconnection bracket.

FIG. 2 is a front view of the furniture panel 10. FIG. 3 is a front view of the bracket 18. As shown in the FIG. 3, the openings 20 in the bracket 18 are generally rectangular. It is understood that different geometries may be used for the openings 20. FIG. 4 is a side view of the bracket and FIG. 5 is a top view of the bracket 18. As shown in FIG. 5, the bracket 18 includes an opening 24 at each end. Opening 24 allows the bracket 18 to be connected to the frame members 12 using fasteners. FIG. 6 is a perspective view of the bracket 18.

Figure 7:
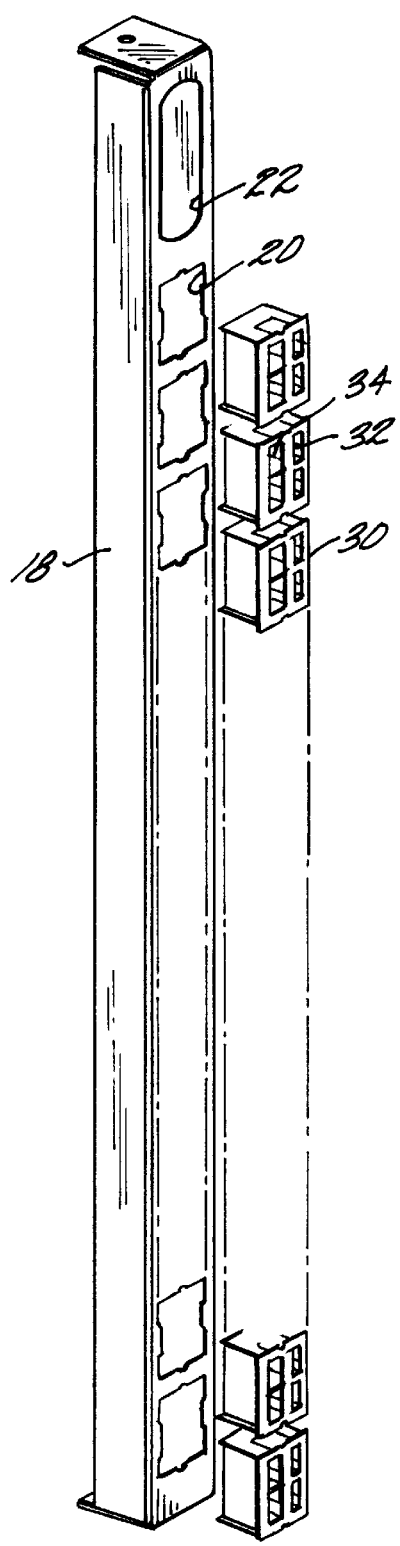
FIG. 7 is an exploded, perspective view of the telecommunications interconnection bracket and telecommunications connectors.
Figure 8:
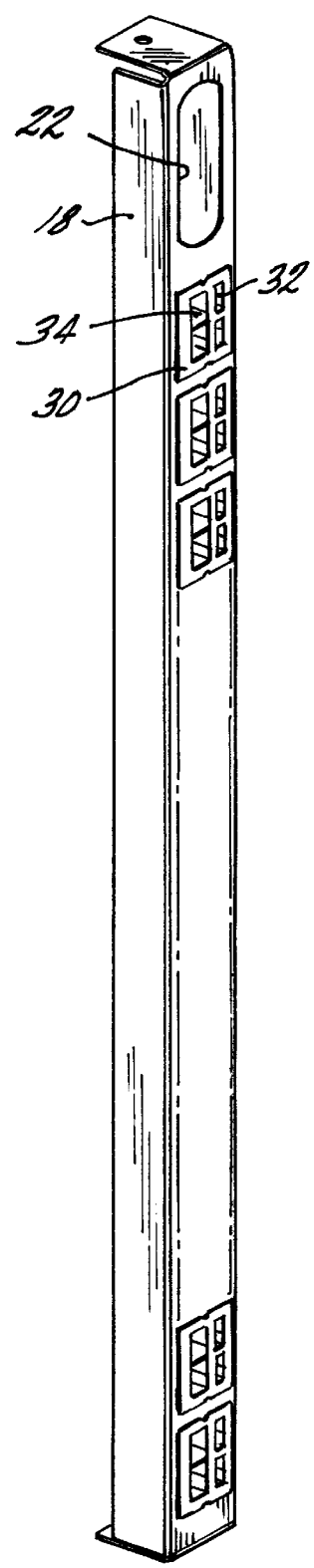
FIG. 8 is a perspective view of the telecommunications interconnection bracket fitted with telecommunications connectors.

FIG. 7 is an exploded, perspective view of the bracket 18 and telecommunications connectors 30. Each connector 30 is mounted in a bracket opening 20. The telecommunication connectors 30 provide an interconnection point for the horizontal cabling between the telecommunications closet and the work area outlet equipment. The connectors 30 shown in FIG. 7 include two ports 34 for receiving a connector fitted on a cable. Each connector 30 also includes an icon receiving recess 32 for receiving an identification icon (not shown). It is understood that the number of ports in each connector 30 may vary. Although the connectors shown in FIG. 7 are all identical, it is understood that a variety of different connectors may be mounted in the bracket 18 to accommodate different cable types (copper, optical fiber, coaxial, etc.) and different connector standards (RJ-11, ST, SC, etc.). In addition, alternative brackets for mounting a variety of interconnection hardware such as 50-pair, 110 disconnect blocks, JP blocks, etc. may be used. FIG. 8 is a perspective view of the bracket 18 fitted with the connectors 30.

Figure 9:
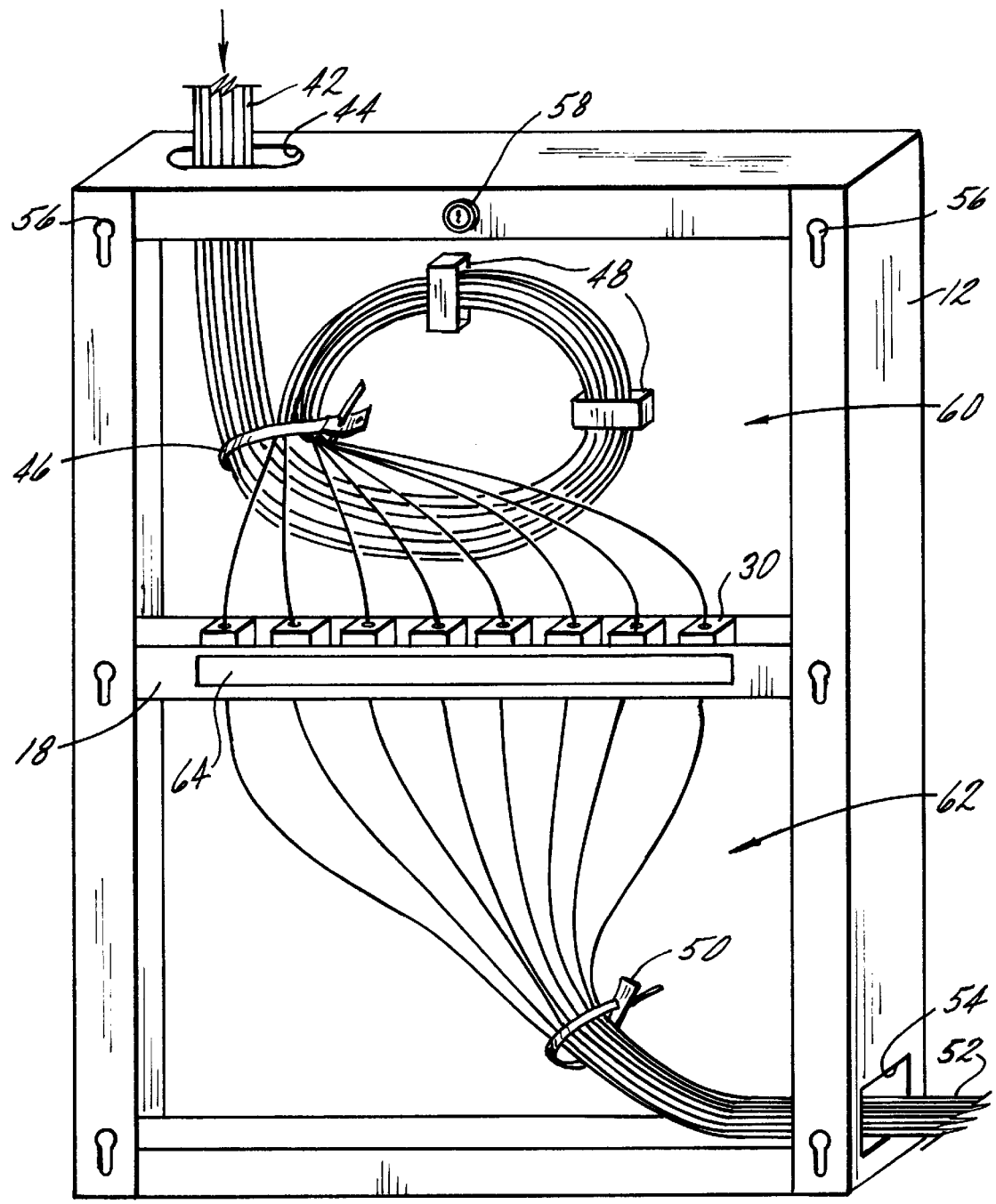
FIG. 9 is a perspective view of a modular furniture panel including a telecommunications interconnection bracket and cable.

FIG. 9 is a perspective view of an exemplary embodiment of the present invention. As shown in FIG. 9, cable 42 is introduced into the furniture panel through an input opening 44. The incoming cable 42 may be coiled and stored in an area 60 on one side of the bracket 18 referred to as the administrative area 60. The cable is managed by using assorted cable management devices 46 and 48 such as those available from The Siemon Company of Watertown, Conn. The incoming cables are fitted with connectors which mate with the connectors 30 mounted to the bracket 18. The bracket 18 includes a label area 64 for identifying the cables terminated at the bracket 18. Alternatively, the bracket 18 may include recessed icon-receiving pockets for receiving identification icons for color coding.

Figure 10:
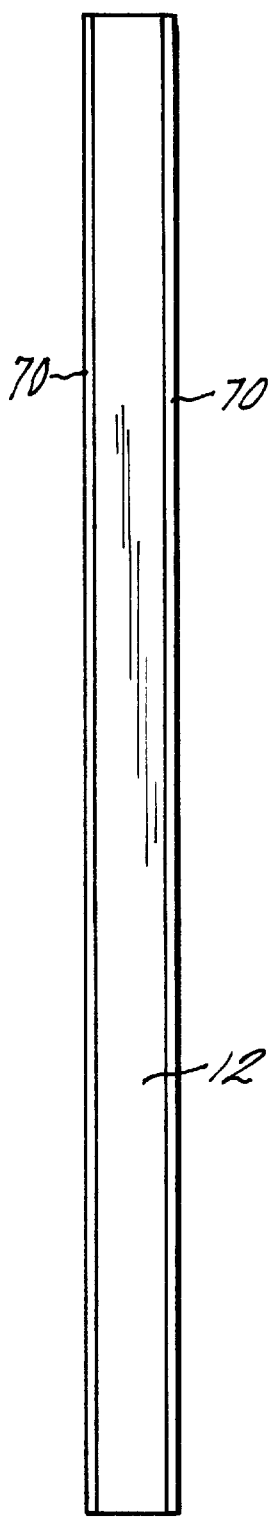
FIG. 10 is a side view of the modular furniture panel fitted with covers.
Figure 11:
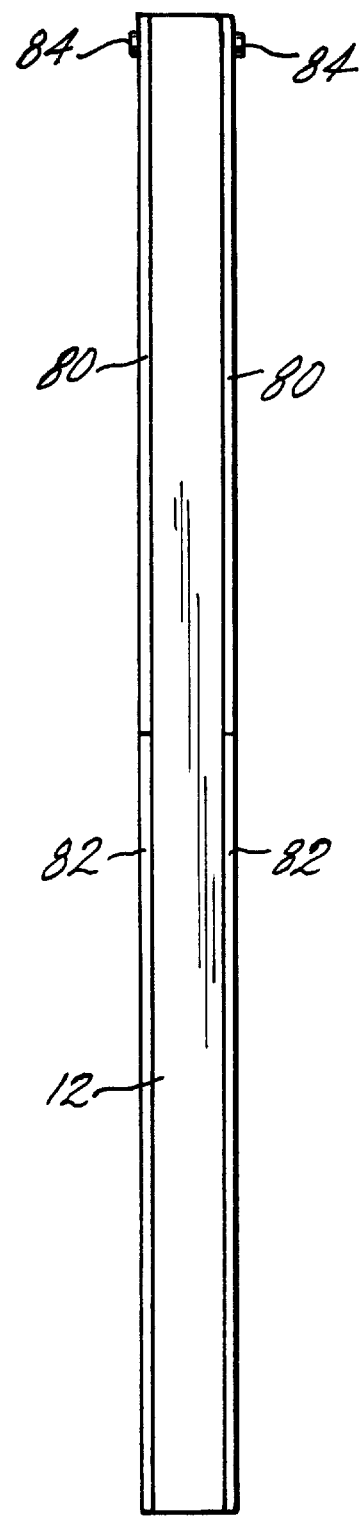
FIG. 11 is a side view of the modular furniture panel with multiple covers.

At the other side of the bracket 18, cable 52 is routed through an area 62 referred to as the user area. The exiting cable 52 may be managed by cable management devices 50 such as those available from The Siemon company of Watertown, Conn. The cable 52 exits the furniture panel through an exit opening 54. Slots 56 are provided on both sides of the furniture panel 10 for mounting front and rear panel covers 70 as shown in FIG. 10. The front and rear removable covers 70 conceal the cables and interconnections when installed. Also provided is an optional lock 58 which will cooperate with the front and rear panel covers to prevent access to the interior of the furniture panel. The administrative area 60 and the user area 62 within the framework, between the front and rear covers, define areas for routing, storing and managing telecommunications cables. In the case of fiber optic cables, this space may also be utilized for storing slack fiber and mounting splice trays to provide splice capabilities. Separate panel covers may be used for the administrative area 60 and the user area 62 so that access to the administrative area is limited and access to the user area is less limited. As shown in FIG. 11, the modular furniture panel includes a first cover 80 for covering the administrative area. A second cover 82 covers the user area. A lock 84 is provided on the first covers 84 to limit access to the administrative area. Alternatively, a single, lockable cover may be used to limit access to both areas.

Use of the interconnection bracket eliminates the need to remove entire lengths of horizontal cable as a result of rearranging the office furniture that houses the cables. According to industry standard practice, if the maximum distance of the horizontal cable and work area cable is met, the work area cables may be routed from the interconnection point directly to work area equipment, thus eliminating the need for outlet hardware (faceplate or furniture adapter and connectors), thereby reducing labor and cost. The modular furniture panel framework includes mounting locations for cable managers (e.g., cable ties, velcro cable managers) that allow users to manage and store cable service loops.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A modular furniture panel for use in an office environment comprising:

a panel frame including a plurality of members;

a bracket connected to at least one of said members;

a telecommunications connector mounted to said bracket and connected to a first cable and a second cable said first cable and said second cable being separate said telecommunications connector connecting said first cable and said second cable;

a front cover concealing one side of said frame; and a rear cover concealing another side of said frame.

2. The modular furniture panel of claim 1 wherein said bracket includes a label area for identifying cables terminated at said bracket.

3. The modular furniture panel of claim 2 wherein said bracket includes connector openings formed therein for receiving said telecommunications connector.

4. The modular furniture panel of claim 1 wherein said bracket includes recesses for receiving identification icons.

5. The modular furniture panel of claim 4 wherein said bracket includes connector openings formed therein for receiving said telecommunications connector.

6. The modular furniture panel of claim 1 wherein said bracket includes an opening for routing cable through said bracket.

7. The modular furniture panel of claim 1 wherein said bracket includes an opening for routing cable through said bracket.

8. The modular furniture panel of claim 1 wherein said plurality of members includes a first member having an input opening for routing cable into the modular furniture panel.

9. The modular furniture panel of claim 8 wherein said plurality of members includes a second member having an output opening for routing cable out of the modular furniture panel.

10. The modular furniture panel of claim 1 wherein said plurality of members includes a second member having an output opening for routing cable out of the modular furniture panel.

11. The modular furniture panel of claim 1 further comprising an administrative area on one side of said bracket.

12. The modular furniture panel of claim 11 further comprising a wire management device positioned in said administrative area.

13. The modular furniture panel of claim 11 further comprising a user area on another side of said bracket.

14. The modular furniture panel of claim 13 further comprising a wire management device positioned in said user area.

15. The modular furniture panel of claim 1 wherein one of said front cover and said rear cover includes a lock.

16. The modular furniture panel of claim 1 wherein said bracket includes connector openings formed therein for receiving said telecommunications connector.

17. The modular furniture panel of claim 1 wherein said telecommunications connector includes:

a first telecommunications connector connected to the first cable;

a second telecommunications connector attached to the second cable, said second telecommunications connector being matable with said first telecommunications connector to connect said first cable and said second cable.

18. The modular furniture panel of claim 1 further comprising:

an administrative area on one side of said bracket; and a user area on another side of said bracket; and wherein said front cover includes a first cover for covering said administrative area and a second cover for covering said user area.

19. The modular furniture panel of claim 18 wherein said first cover includes a lock.

20. A modular furniture panel for use in an office environment comprising:

a panel frame including a plurality of members;

a bracket connected to at least one of said members;

a telecommunications connector mounted to said bracket and connected to a first cable and a second cable;

a front cover concealing one side of said frame; and a rear cover concealing another side of said frame wherein said telecommunications connector comprises:

a first telecommunications connector mounted in said bracket and connected to the first cable;

a second telecommunications connector attached to the second cable, said second telecommunications connector being matable with said first telecommunications connector to connect said first cable and said second cable.

21. A modular furniture system for use in an office environment comprising:

a first modular furniture panel including
a panel frame including a plurality of members;
a bracket connected to at least one of said members;
a telecommunications connector mounted to said bracket and connected to a first cable and a second cable;
a front cover concealing one side of said frame;
a rear cover concealing another side of said frame; and a second modular furniture panel including;
a panel frame including a plurality of members;
a bracket connected to at least one of said members;
a telecommunications connector mounted to said bracket and connected to a first cable and a second cable;
a front cover concealing one side of said frame;
a rear cover concealing another side of said frame.

22. The modular furniture panel of claim 21 wherein said telecommunications connector in said first panel includes:

a first telecommunications connector connected to the first cable;

a second telecommunications connector attached to the second cable, said second telecommunications connector being matable with said first telecommunications connector to connect said first cable and said second cable.

23. The modular furniture panel of claim 21 wherein said telecommunications connector in said second panel includes:

a first telecommunications connector connected to the first cable;

a second telecommunications connector attached to the second cable, said second telecommunications connector being matable with said first telecommunications connector to connect said first cable and said second cable.

* * * * *